June 13, 1944. C. HANNEVIG 2,351,334
TIRES, OR SHOES FOR AUTOMOBILES, AIRPLANES, AND THE LIKE
Filed Sept. 21, 1942

INVENTOR.
CHRISTOFFER HANNEVIG.
BY Peter M. Bowey
ATTORNEY.

Patented June 13, 1944

2,351,334

UNITED STATES PATENT OFFICE 2,351,334

TIRE OR SHOE FOR AUTOMOBILES, AIRPLANES, AND THE LIKE

Christoffer Hannevig, New York, N. Y.

Application September 21, 1942, Serial No. 459,144

4 Claims. (Cl. 152—247)

This invention relates to new and useful improvements in tires, and the like; and more particularly it refers to tires, or shoes used on automobiles, airplanes, etc.

The purpose of this invention is to provide a tire, that is comparatively simple of construction, and in the making of which, besides rubber, any other suitable material may be used, such as plywood, steel, etc.

With the above and other objects in view, this invention consists of the novel features of construction, combination, and arrangement of parts, hereinafter fully described, claimed, and illustrated in the accompanying drawing, forming part of this application, and in which similar characters of reference indicate corresponding parts in all views, and in which:

Figure 1:
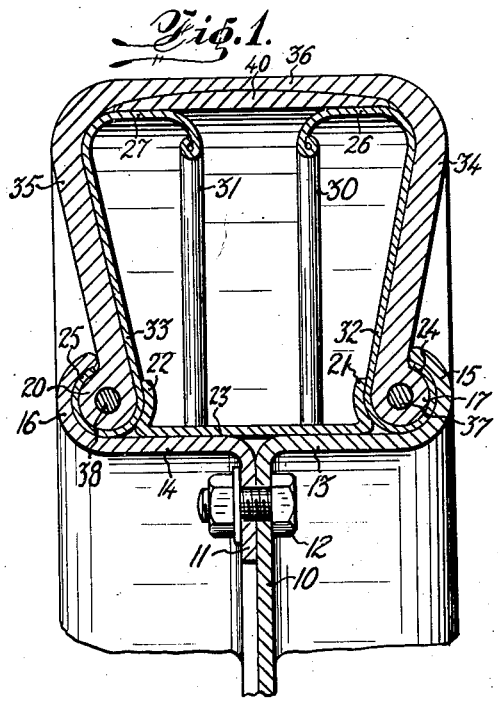
Figure 1 is a cross section of a vehicle wheel rim, with a tire mounted thereon and constructed in accordance with the present invention.

As shown in Figure 1, a portion of a vehicle wheel includes a disc member or spider fragment 10, cooperating with which is a removable rim section, or member 11; said members being provided with apertures in which bolts 12, only one of which is shown in the drawing, are mounted.

The members 10, 11 have outwardly turned felly portions 13, 14, forming a rim base, curled flanges 15, 16 of which provide seats for tire beads 17, 20. Also forming seat parts for the tire beads are flanges 21, 22, of a rim band 23; the latter, as well as the removable member 11 and member 10 being constructed of metal.

Inner tire supports of resilient sheet metal include curled flanges or bead portions 24, 25, tread support crowns 26, 27 having reinforcings, ribs 30, 31, and splayed webs or side walls 32, 33.

Integrated with the metal tire supports at the webs 32, 33 are side walls 34, 35, of a carcass of vulcanized rubber or yieldable material, which also includes a tread 36, as well as said portions 17, 20, the latter being also integrated with the curled bead portions 24, 25. The tire beads or solid tube rings have therein cables 37, 38 in the present case shown as single wires, although said cables may also consist each of multiple wires. An inner flexible tread 40 of vulcanized rubber, which freely rests against the tread 36, has its marginal sides integrated with or permanently attached to the crowns 26, 27. Under load or working conditions, the segmental sheet metal supports, including said crowns, are designed for movement laterally, in both or opposite directions, as well as for movement inwardly, with the tread 36, 40, such inward movement being towards the rim base 13, 14, and it being understood that the outer wall tire portions 34, 35, are movable with their supporting parts 32, 33.

Figure 2:
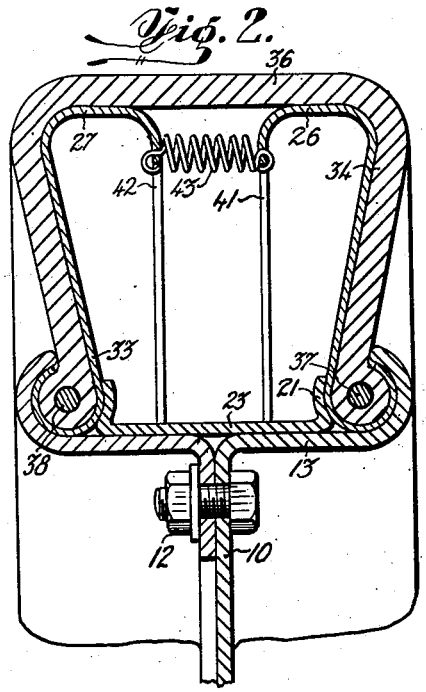
Figure 2 is a section similar to Figure 1, but showing a modification of structure.

In the disclosed modified forms of the invention, structures like those of Figure 1 are identified by similar reference characters, and the disclosure of Figure 2 differs from the embodiment first described in detail, in that in Figure 2 the tread member 40 is omitted, the tread 36 being deeper than that of Figure 1. Ribs 30, 31 are also omitted from Figure 2, in which annular flange portions 41, 42, have therein registering apertures, in which opposite ends of a coil spring 43 are grippingly disposed. Any number of springs 43 may be used.

Figure 3:
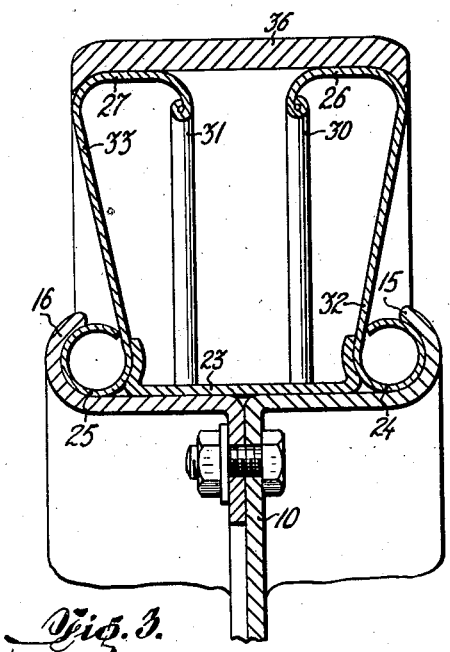
Figure 3 is a section showing another modified form of a tire.

In Figure 3 a minimum of vulcanized rubber or limitedly flexible material is used; it being seen that the tread 36 of this embodiment has its margins permanently attached to the crowns 26, 27, and no other outer rubber covering is utilized in this embodiment.

Figure 4:
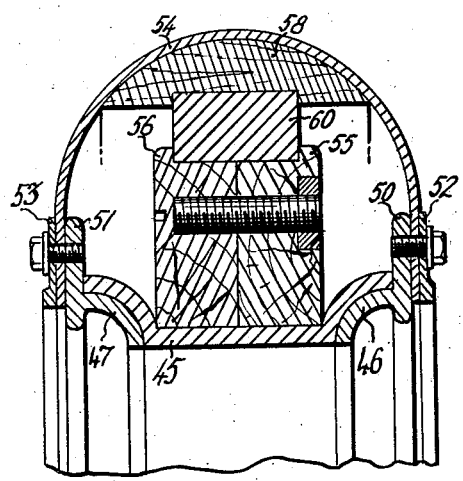
Figure 4 is a section showing still another modification of my invention.

In the showing of Figure 4 an annular rim band 45 differs from the band 23, this modified embodiment including also wheel rims having cross sectionally curved portions 46, 47, on which similarly curved portions of the band 45 find seats. In flat rim bands 50, 51 are threaded apertures, with which set screws, as shown, cooperate; this being to embrace therein inwardly spring strips 52, 53, forming the margins of a flexible tire member, having a tread 54 of arcuate cross section; said member being also of vulcanized rubber or other limitedly yieldable material.

Seated on the illustrated flat portion of the rim base 45 is a compound wooden ring, the latter having substantially like members 55, 56, attached by bolts 57, only one of which is shown, and said members being each constructed with two sections in non-registry, whereby said compound ring may be assembled on the base 45.

Disposed within the concavity of the tread 54 is a wooden ring member 58, spaced from the ring 55, 56; and since the spaced wooden rings or parts are provided with opposed registering annular recesses, in which is a vulcanized rubber ring 60, this construction is capable of a beneficial yieldable cushioning movement, also in working or under load conditions.

It is obvious that slight changes may be made in the form, construction, and arrangement of the several parts, as shown, within the scope of the appended claims, without departing from the spirit of my invention, and I do not, therefore, wish to limit myself to the exact construction and arrangement shown and described herein.

What I claim as new and desire to secure by Letters Patent of the United States is:

1. A tire for automobiles, airplanes, and the like, comprising two frames spaced apart, each of the latter having the shape substantially as an inverted U, each of said frames comprising integrally, a radially outwardly flaring side wall, a curved top portion, or tread, and an inner vertically disposed rib adapted to reinforce said tread portion; resilient means connecting the upper portions of said frames, a rubber material surrounding the latter, and means for securing said tire to a wheel.

2. A tire for automobiles, airplanes, and the like, comprising two radially outwardly flaring side walls, the latter being curved at the top to form tread-portions, ribs adapted to reinforce said tread-portions and integral with the latter, a flexible rubber member arranged on top of said tread-portions and having its end portions integrally secured to the latter, a rubber material surrounding said side walls and being in loose contact with the flexible rubber member on top of the curved tread-portions.

3. A tire of the class described, comprising two radially outwardly flaring side walls spaced apart, the latter being curved at the top to form tread support crowns, ribs vertically disposed for reinforcing said tread crowns and being integral with the latter, a flexible rubber member arranged on top of said tread crowns and having its marginal sides integrated with the latter, a vulcanized rubber material surrounding said side walls and being in loose contact with the flexible member on top of the tread crowns.

4. A tire for automobiles, airplanes, and the like, comprising two spring members spaced apart, each of the latter having the form substantially as an inverted U, said spring members having radially outwardly flaring side portions and curved top portions, inner elongated flanges integral with said spring members and being vertically disposed, and a coiled spring connecting said flanges; a rubber tread integral with the top and sides of the spring members, and bottom members adapted to receive the latter, and means for securing the bottom members and said spring members to a wheel.

CHRISTOFFER HANNEVIG.